June 2, 1964     E. E. HULSEY     3,135,293
ROTARY CONTROL VALVE
Filed Aug. 28, 1962     3 Sheets-Sheet 1
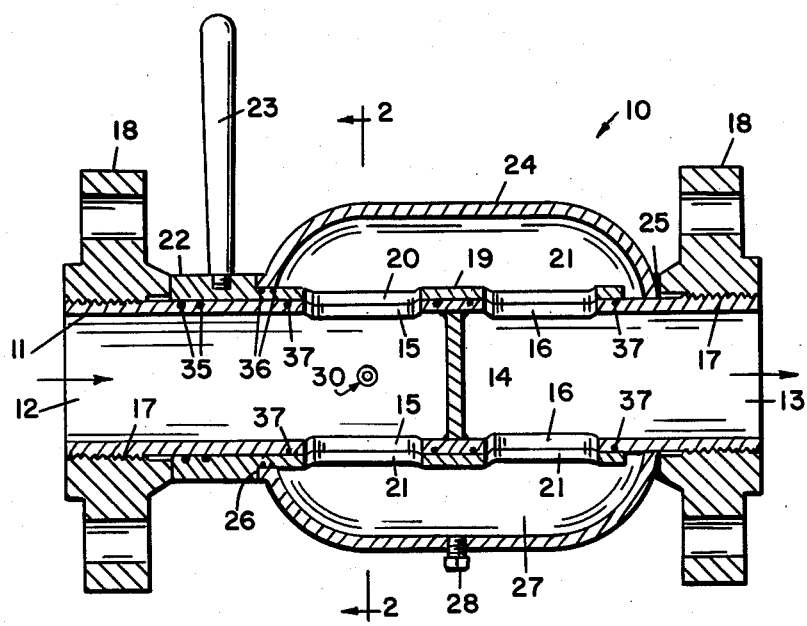
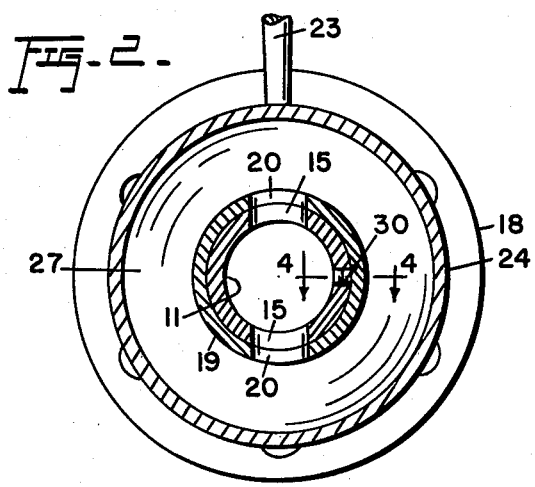
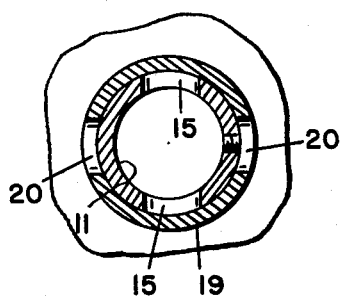
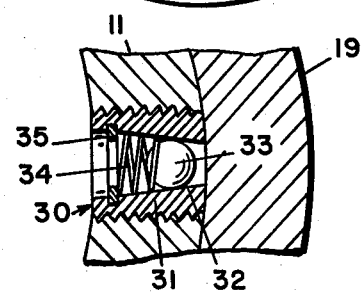
INVENTOR
ELDON E. HULSEY
BY Munson H. Lane
ATTORNEY

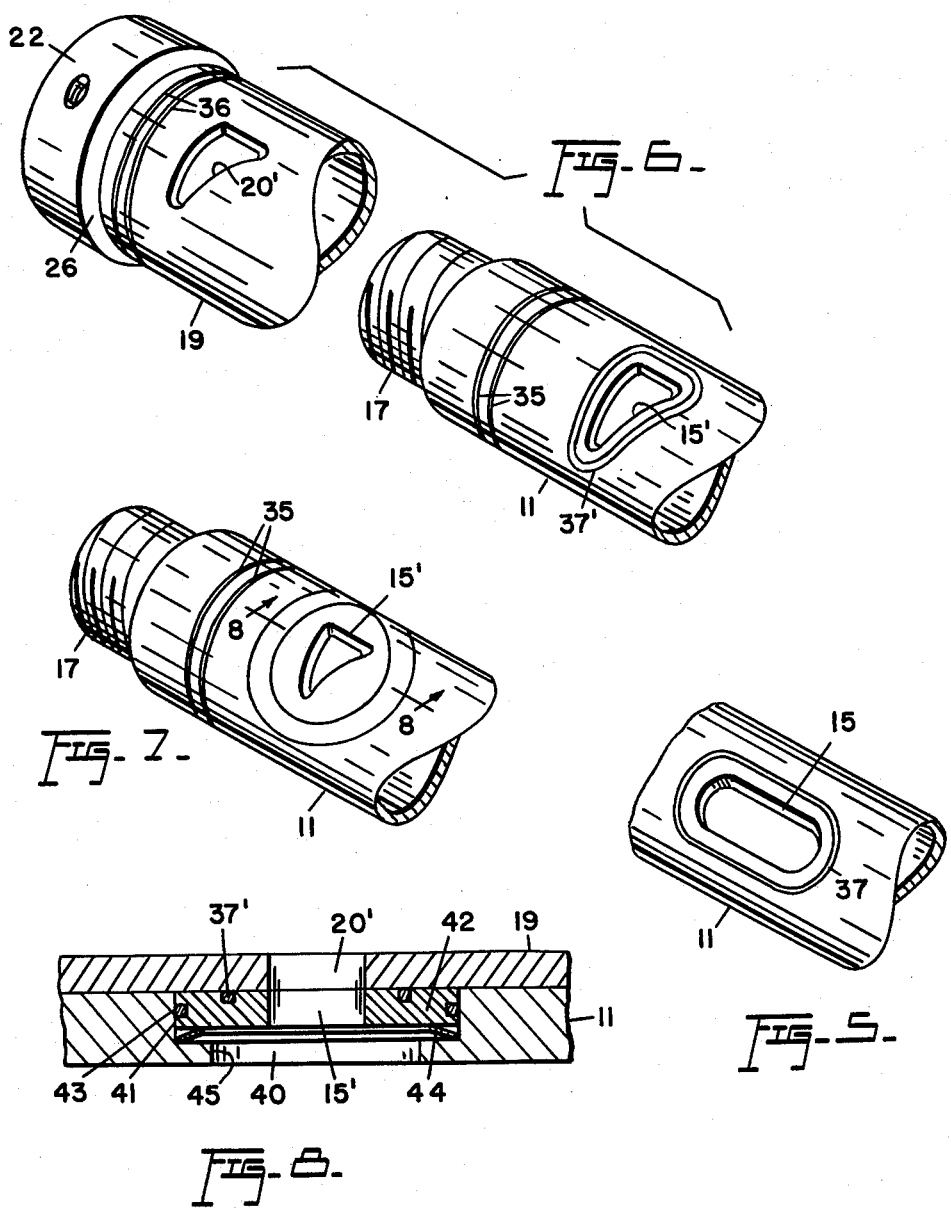

United States Patent Office 3,135,293
Patented June 2, 1964

3,135,293
ROTARY CONTROL VALVE
Eldon E. Hulsey, 2925 Bell Knoll Lane, Dallas 29, Tex., assignor of ten percent to Robert L. Erwin, Farmington, N. Mex.
Filed Aug. 28, 1962, Ser. No. 219,846
11 Claims. (Cl. 137—625.31)

This invention relates to new and useful improvements in rotary sleeve valves suitable for controlling the flow of either liquids or gases, and the principal object of the invention is to provide a valve of this type which is very simple in construction, highly efficient in operation, and economical from the standpoint of both manufacture and maintenance.

The valve in accordance with the present invention embodies various structural improvements and refinements in the rotary sleeve valve of the general type disclosed in United States Patent No. 3,005,468, issued October 24, 1961, one of such improvements involving the provision of a housing which surrounds the rotary valve sleeve but is fixed to the valve body on which the sleeve is rotatably positoned. Another improvement involves the provision of a pressure relief valve in the valve body, which provides equalization of fluid pressures existing in the valve housing and the fluid inlet of the valve body when the valve is closed. Still another improvement resides in the provision of replaceable or interchangeable valve ports in the valve body, which facilitate convenient and economical maintenance as well as the use of ports with different flow characteristics in the same valve. Still another improvement involves the provision of a valve having a plurality of ports of different sizes through which fluid flow may be selectively and individually directed to effect an efficient throttling or metering of the flow.

Other objects, features and advantages of the invention will become apparent from the following description taken in conjunction with the accompanying drawings, wherein like characters of reference are employed to designate like parts, and wherein:

FIGURE 1 is a longitudinal sectional view of the improved valve;

FIGURE 2 is a cross-sectional view, taken substantially in the plane of the line 2—2 in FIGURE 1;

FIGURE 3 is a fragmentary sectional view, similar to that shown in FIGURE 2 but illustrating the valve in the closed position;

FIGURE 4 is an enlarged, fragmentary sectional detail, taken substantially in the plane of the line 4—4 in FIGURE 2 and showing the pressure relief valve;

FIGURE 5 is a fragmentary perspective view showing one form of the valve ports;

FIGURE 6 is a fragmentary group perspective view showing another form of the ports;

FIGURE 7 is a fragmentary perspective view showing a replaceable port;

FIGURE 8 is an enlarged sectional detail, taken substantially in the plane of the line 8—8 in FIGURE 7, but with the sleeve in position on the valve body;

Figure 9:
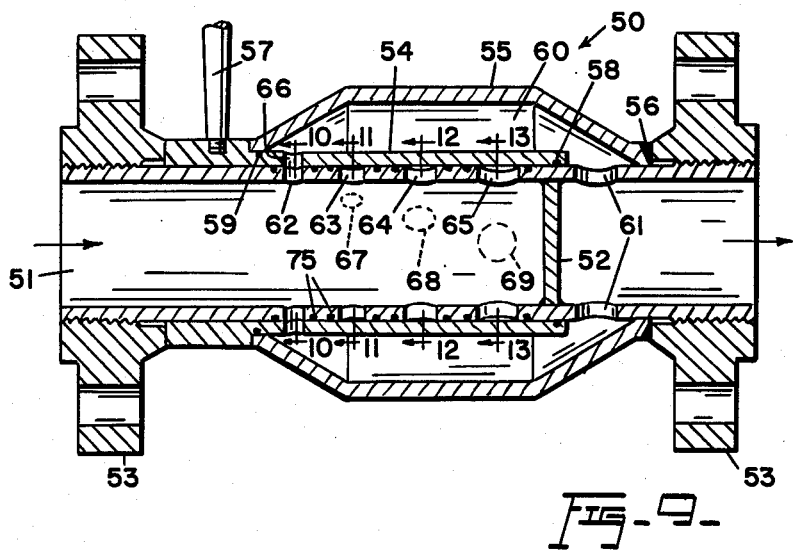
FIGURE 9 is a longitudinal sectional view of a modified embodiment of the valve.

Referring now to the accompanying drawings in detail, more particularly to FIGURES 1-3, the rotary sleeve valve in accordance with the invention is designated generally by the reference numeral 10 and embodies in its construction a tubular valve body 11 having a fluid inlet 12 and an outlet 13, with a transverse partition 14 secured in the valve body intermediate its ends. The tubular body 11 is also provided with pairs of valve ports 15, 16, the ports in each pair being longitudinally aligned but spaced so that they communicate with the respective inlet and outlet end portions of the body. The end portions of the body 11 are externally screw-threaded as at 17 to receive a pair of apertured mounting flanges 18, whereby the entire valve may be connected to suitable pipe lines (not shown). If desired, one of these flanges may be permanently secured to the valve body, as by welding, in place of screw-threads, but the other flange should be removable in order to facilitate assembly of the sleeve and housing (hereinafter described) on the valve body.

A tubular sleeve 19 is rotatably positioned on the valve body 11 and is provided with pairs of longitudinally aligned but spaced valve ports or port openings 20, 21 which are in register with the respective ports 15, 16 in the body 11 when the sleeve is rotated to the position shown in FIGURES 1 and 2. This, of course, is the open position of the valve, while its closed position is shown in FIGURE 3, wherein the sleeve 19 has been rotated through 90° on the body 11. One end portion of the sleeve 19 is thickened as indicated at 22 and has secured thereto to radially projecting handle or lever 23, whereby rotation of the sleeve may be effected, either manually or by a mechanical control. Any suitable stop means may be employed for preventing rotation of the sleeve beyond the open and closed positions of the valve.

A bulbous housing 24 surrounds the sleeve 19 in coaxial relation, one end of the housing being rigidly secured, as by the weld 25, to the adjacent of the flanges 18 and to the valve body 11, while the other end of the housing is rotatably positioned on the sleeve 19 and rotatably abuts a shoulder 26 at the enlargement 22 of the sleeve. The interior of the housing 24 provides an annular chamber 27 around the sleeve, and when the valve is open, fluid may pass from the body inlet 12 through the ports 15, 20 into the chamber 27, and then through the ports 21, 16 to the body outlet 13. The housing 24 is provided with a removable drain plug 28 for draining and/or flushing out the valve. Also, with the valve in its closed position, the plug 28 may be removed to vent the chamber 27 to the atmosphere for testing the ports for leakage.

A pressure relief valve 30 is provided in the body 11 between the ports 15 as shown in FIGURES 1 and 2. The valve 30 is illustrated in detail in FIGURE 4 and comprises an externally screw-threaded member 31 which is threaded into a screw-threaded aperture formed in the body 11 and is provided with an outwardly tapered or frusto-conical passage 32 movably receiving a ball check 33. The ball check is urged to its seated or closed position by a spring 34 which is interposed between the ball check 33 and a keeper ring 35 mounted in the inner end portion of the passage 32. When the valve is open as shown in FIGURE 2, the pressure relief valve 30 in the body 11 is covered by the sleeve 19. However, when the valve is closed as shown in FIGURE 3, the relief valve 30 is exposed through one of the ports 20 in the sleeve and if because of heat expansion, the pressure of fluid trapped in the housing chamber 27 becomes greater than the fluid pressure in the inlet 12, sufficiently to overcome the resiliency of the spring 34, the ball check 33 will become unseated and the fluid pressures in the chamber 27 and inlet 12 will become equalized through the relief valve 30. When this equalization occurs, the spring 34 will automatically return the ball check 33 to its seated position.

Axial sliding of the sleeve 19 on the body 11 is prevented in one direction by abutment of the shoulder 26 with the adjacent end of the housing 24 and, in the opposite direction, by abutment of the enlargement 22 with the adjacent of the flanges 18, as will be clearly apparent from FIGURE 1. The aforementioned weld 25 is made after the various parts are assembled as shown, and if it is desired to disassemble the valve, the weld 25 is broken, the adjacent flange 18 is removed, and the housing 24 with the sleeve 19 are slipped off the body 11. The sleeve 19, of course, may be readily withdrawn from the housing 24.

Annular sealing rings 35 are provided in grooves in the body 11 to frictionally engage the inside of the sleeve enlargement 22, and similar sealing rings 36 are provided in grooves in the sleeve 19 to frictionally engage the adjacent end portion of the housing 24. The ports 15, 16, 20, 21 may be oval-shaped as illustrated in FIGURE 5, and oval-shaped sealing rings 37 are provided in grooves in the body 11 around the ports 15, 16, to frictionally engage the inside of the sleeve 19.

The ports 15, 16, 20, 21 may also have a form other than that of an oval. For example, they may be substantially triangular, as indicated at 15' and 20' in FIGURE 6, in which event substantially triangular sealing rings 37' are employed in the body 11 around the ports in the body.

FIGURES 7 and 8 illustrate a modified arrangement wherein the body 11 is equipped with replaceable or interchangeable valve ports to facilitate economical maintenance as well as usage of ports of various shapes and flow characteristics in the same valve. In this embodiment the body 11 is provided at the location of each port with an opening 40 and with an outwardly opening counterbore 41 which receives a removable insert 42. The insert 42 is equipped with a peripheral seal 43 which engages the counterbore 41, and the port opening 15' is formed in the insert as shown, with the sealing ring 37' surrounding the port opening. The insert 42 is retained in the counterbore 41 by the sleeve 19 when the latter is in position on the body 11, and a suitable spring element 44 urges the insert in engagement with the inside of the sleeve. The spring element 44, which may be a convexo-concave annulus, or the like, is interposed between the insert 42 and an annular shoulder 45 which exists at the junction of the opening 40 with the counterbore 41.

While FIGURES 7 and 8 illustrate the replaceable valve port in conjunction with the triangular ports 15' and 20', the same arrangement is, of course, also applicable to the ports at the outlet side of the valve, as well as to the oval ports 15, 16.

FIGURES 9-13 illustrate a modified embodiment of the valve which is designated generally by the reference numeral 50 and, like the embodiment 10, comprises a tubular valve body 51 with a transverse partition 52 intermediate its ends, and mounting flanges 53 at the ends of the valve body. A tubular sleeve 54 is rotatably positioned on the body 51, while a housing 55 surrounds the sleeve and is secured at one end thereof as at 56 to one of the flanges 53. The other end of the housing 55 is rotatably positioned on the sleeve and the latter projects outwardly therefrom to carry the manipulating handle 57. Suitable annular sealing rings 58, 59 are provided between the body 51 and sleeve 54 and between the sleeve and the housing 55, respectively, as shown.

The interior of the housing 55 provides an annular chamber 60 around the sleeve 54, which chamber communicates through suitable openings or passages 61 with the outlet end of the valve body 51, it being noted that the openings or passages 61 are formed in the outlet end portion of the valve body and that the sleeve 54 terminates upstream from the passages, to make possible the aforementioned communication of the chamber 60 with the outlet end portion of the valve body. The passages 61 are open regardless of whether the valve is open or closed.

The inlet end portion of the valve body 51 is provided with one or more sets of ports, the ports in each set being disposed in a straight row, extending longitudinally of the valve body. For illustrative purposes four ports 62, 63, 64, 65 have been shown in each row, although this number may be greater or lesser, as desired. In any event, the several ports in each set are of different diameters, progressively increasing in size from one end of the row of ports to the other.

The sleeve 54 is provided with one or more sets of port openings, the number of such sets corresponding to the number of sets of the ports in the valve body, and the number of port openings in each set also corresponding to the number of valve body ports in each set. However, the port openings 66, 67, 68, 69 in the sleeve are disposed in a row which extends spirally of the sleeve, so that the several port openings in the set are offset circumferentially as well as longitudinally of the sleeve. The port openings 66, 67, 68, 69 are also of different sizes and correspond to the diameters of the respective ports 62, 63, 64, 65.

Figures 10, 11, 12, 13:
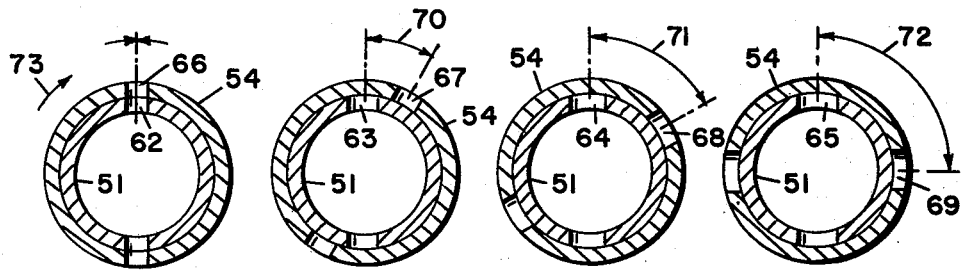
FIGURE 10-13 inclusive are cross-sectional views, taken substantially in the planes of the lines 10—10, 11—11, 12—12 and 13—13, respectively, in FIGURE 9.

The arrangement of the ports and port openings is such that when the sleeve 54 is in the position shown in FIGURES 9 and 10, the port opening 66 is in register with the port 62 so that fluid may flow from the inlet side of the valve into the chamber 60 and through the passages 61 to the outlet side. However, when the sleeve is rotated through the angle 70 in FIGURE 1, the port opening 67 will be brought in register with the port 63, while the port opening 66 is brought out of register with the port 62. Similarly, if the sleeve is rotated through the angles 71 or 72 as shown in FIGURES 12 and 13, respectively, the port openings 68 and 69 will be brought in register with the respective ports 64 and 65. It will be noted that only one particular port opening in the set may be in register at any time with only one particular port, and since the ports are of different sizes, an effective throttling or metering of the fluid flow through the valve is obtained. The fluid flow may be shut off completely by simply rotating the sleeve in the direction of the arrow 73 to a position where none of the port openings is in register with the ports.

As in the previously described embodiments of the valve, the body 51 may be equipped with annular sealing rings 75 around the several ports, as will be clearly apparent.

While in the foregoing there have been described and shown the preferred embodiments of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. A rotary sleeve valve, the combination of a tubular valve body provided with a pair of longitudinally aligned but spaced valve ports, a transverse partition provided in said body between said ports, a tubular sleeve rotatably positioned on said body and provided with a pair of longitudinally aligned but spaced port openings registrable with the respective valve ports when the sleeve is rotated to a predetermined position relative to said body, and a housing surrounding said sleeve in coaxial spaced relation to form an annular chamber around said sleeve, one end of said housing rotatably receiving therein one end portion of said sleeve and the other end of said housing extending longitudinally beyond the other end of the sleeve and being sealingly secured to said body.

2. The device as defined in claim 1 wherein said one end portion of said sleeve projects outwardly from said one end of said housing, and means provided on the projecting end portion of the sleeve for rotating the same.

3. The device as defined in claim 1 together with a normally closed pressure relief valve provided in said body at one side of said partition, said pressure relief valve being communicable with said annular chamber of said housing through one of the port openings of said sleeve.

4. The device as defined in claim 1 together with a removable drain plug provided on said housing.

5. The device as defined in claim 1 together with removable inserts provided in said body and having said valve ports formed therein.

6. In a rotary sleeve valve, the combination of a tubular valve body having inlet and outlet ends, a transverse partition provided intermediate the ends of said valve body and separating the inlet end thereof from the outlet end, the inlet end portion of said body being provided with at least one valve port, a tubular sleeve rotatably positioned on said body and provided with a port opening registrable with said valve port when the sleeve is rotated to a predetermined position relative to said body, a housing surrounding said sleeve in coaxial spaced relation to form an annular chamber around said sleeve, one end of said housing rotatably receiving therein one end portion of said sleeve and the other end of said housing extending longitudinally beyond the other end of the sleeve and being sealingly secured to said body, and passage means communicating said chamber with the outlet end portion of said valve body.

7. The device as defined in claim 6 wherein said tubular valve body is provided in its lateral wall with an opening and with an outwardly oriented counterbore forming a shoulder at the junction of said opening with the counterbore, an insert removably positioned in said counterbore and having said valve port formed therein, said sleeve retaining said insert in the counterbore, and a spring interposed between said shoulder and said insert for biasing the latter against the inner surface of said sleeve.

8. The device as defined in claim 7 together with an endless sealing ring positioned in a groove formed in said insert in surrounding relation to said valve port, said sealing ring frictionally engaging the inner surface of said sleeve.

9. The device as defined in claim 7 together with a continuous sealing ring positioned in a peripheral groove formed in said insert and frictionally engaging said counterbore.

10. The device as defined in claim 6 wherein said one end portion of said sleeve projects outwardly from said one end of said housing, and means provided on the projecting end portion of the sleeve for rotating the same.

11. The device as defined in claim 6 together with a normally closed pressure relief valve provided in the inlet end portion of said body, said pressure relief valve being communicable with said annular chamber of said housing through said port opening of said sleeve.

References Cited in the file of this patent

UNITED STATES PATENTS

| 2,143,565 | Minea | Jan. 10, 1939 |
| 2,858,851 | Holl | Nov. 4, 1958 |
| 2,893,430 | Holl | July 7, 1959 |
| 3,005,468 | Erwin | Oct. 24, 1961 |

FOREIGN PATENTS

| 537,134 | France | Feb. 24, 1922 |